(12) United States Patent
Opp et al.

(10) Patent No.: US 8,240,604 B2
(45) Date of Patent: Aug. 14, 2012

(54) FIREPROOF BIDIRECTIONAL DECOMPRESSION PANEL

(75) Inventors: Fred W. Opp, Camano Island, WA (US); Keith A. Krueger, Stanwood, WA (US)

(73) Assignee: BE Intellectual Property, Inc., Wellington, FL (US)

( * ) Notice: Subject to any disclaimer, the term of this patent is extended or adjusted under 35 U.S.C. 154(b) by 325 days.

(21) Appl. No.: 12/637,721

(22) Filed: Dec. 14, 2009

(65) Prior Publication Data

US 2011/0139931 A1 Jun. 16, 2011

(51) Int. Cl.
*B64D 11/00* (2006.01)
(52) U.S. Cl. .............. 244/118.5; 244/129.2; 244/129.1
(58) Field of Classification Search ............ 244/118.1, 244/118.5, 117 R, 129.4, 129.5; 52/1
See application file for complete search history.

(56) References Cited

U.S. PATENT DOCUMENTS

| | | | |
|---|---|---|---|
| 4,703,908 A | 11/1987 | Correge et al. | |
| 4,899,960 A * | 2/1990 | Hararat-Tehrani et al. | 244/118.5 |
| 5,606,829 A | 3/1997 | Hararat-Tehrani | |
| 5,871,178 A | 2/1999 | Barnett et al. | |
| 6,029,933 A | 2/2000 | Holman et al. | |
| 6,364,153 B1 | 4/2002 | Petzitillo, Jr. et al. | |
| 6,435,455 B1 * | 8/2002 | Holman et al. | 244/118.5 |
| 6,732,883 B2 | 5/2004 | Petzitillo, Jr. et al. | |
| 6,866,227 B2 | 3/2005 | Pratt et al. | |
| 7,503,524 B2 * | 3/2009 | Fournie et al. | 244/129.4 |
| 7,654,487 B2 * | 2/2010 | Ghoreishi et al. | 244/118.5 |
| 2010/0288880 A1 * | 11/2010 | Bachelard et al. | 244/118.5 |

FOREIGN PATENT DOCUMENTS

| | | |
|---|---|---|
| EP | 1186531 A2 | 3/2002 |
| GB | 2010398 A | 6/1979 |

OTHER PUBLICATIONS

EPO, International Search Report and Written Opinion for PCT International Application No. PCT/US2010/059717 dated Aug. 18, 2011.

* cited by examiner

*Primary Examiner* — Christopher P Ellis
*Assistant Examiner* — Medhat Badawi
(74) *Attorney, Agent, or Firm* — Fulwider Patton LLP

(57) ABSTRACT

A fireproof, bi-directional decompression panel includes a frame member and a pressure relief panel member that is releasably retained to the frame member to removably cover a decompression vent opening of an aircraft partition, such as a sidewall of an aircraft cargo compartment. During a decompression event, the pressure relief panel member is released bi-directionally in either of two opposing directions from the frame member when a predetermined pressure differential exists across the partition. The decompression panel assembly is fire resistant, and has reduced weight and fewer parts than prior conventional decompression panel assemblies.

15 Claims, 1 Drawing Sheet

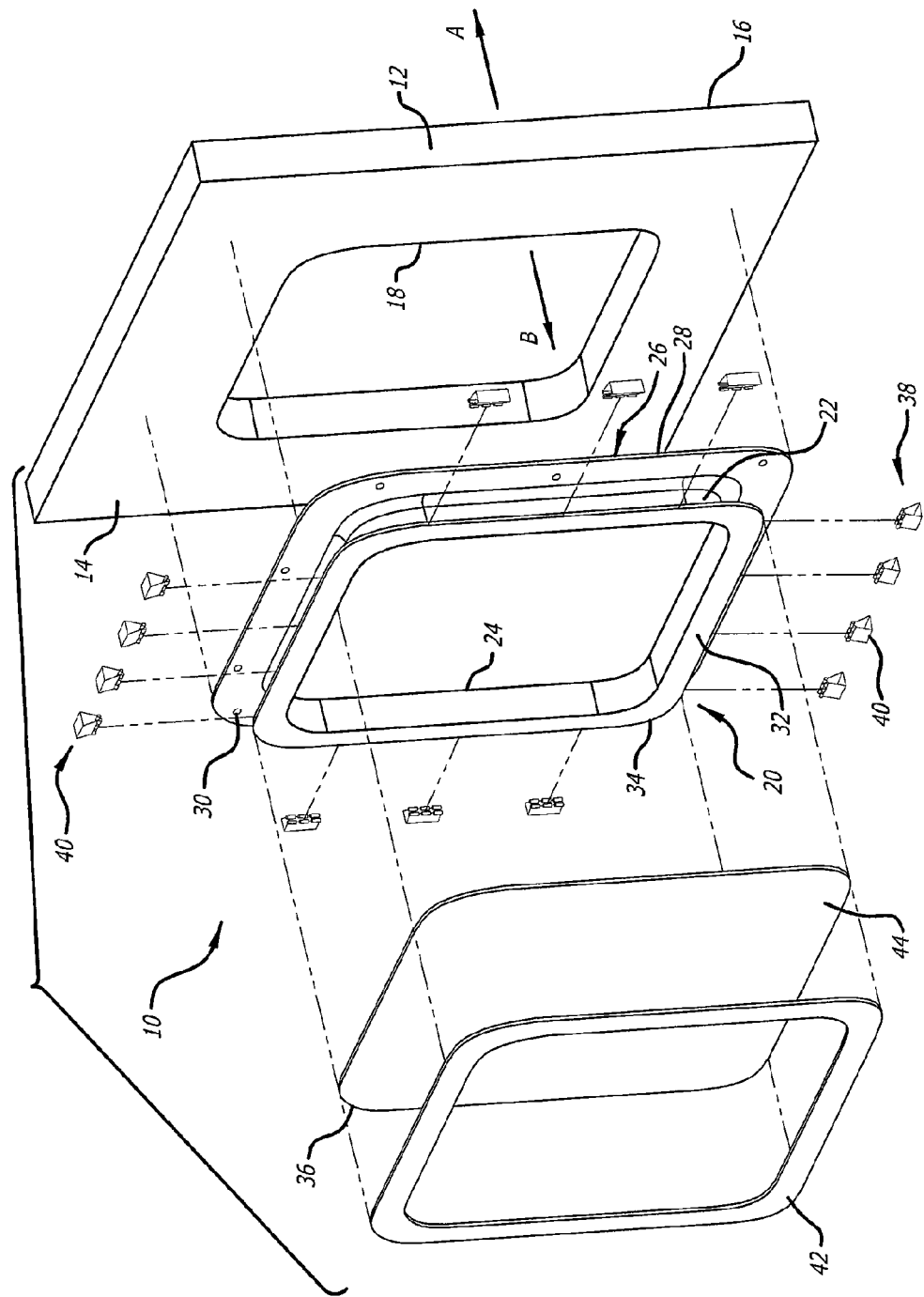

FIREPROOF BIDIRECTIONAL DECOMPRESSION PANEL

BACKGROUND OF THE INVENTION

The present invention relates to decompression panels for use in a partition of an aircraft, and more particularly relates to a decompression panel assembly having a flame resistant bidirectional pressure relief panel that releases in either of two opposing directions from the decompression panel assembly during a decompression event.

Cabin pressurization in aircraft flying at high altitudes maintains a safe and comfortable environment for crew and passengers. Rapid decompression of aircraft can cause structural damage to the aircraft, such as deformation of floors and internal panels. Modern commercial jets have blow-out panels or decompression pressure relief panels at decompression pressure relief vents in various partitions between pressurized compartments of the aircraft, such as between the passenger compartment and the cargo hold, to allow for equalization of an otherwise potentially destructive internal pressure differential between the compartments.

A blow-out panel or decompression pressure relief panel designed to be installed within a lower hold Class C cargo compartment of an aircraft, as defined by 14 CFR, §25.857, at decompression pressure relief vents in sidewalls of the lower hold cargo compartment should provide airflow between the main cabin and lower hold cargo compartment during a decompression event, and must be capable of withstanding a 1,600° F. (871° C.) wall of flame for 5 minutes without permitting any flame penetration, as defined by 14 CFR, Part 25, Appendix F, Part III. During a decompression event, the panel should blow free at a differential pressure less than 0.50 psi and greater than about 0.20 psi. In a typical aircraft lower hold, there are decompression panels that are designed to blow free into the cargo hold (for a lower lobe blowout), and decompression panels that are designed to blow outward from the lower hold (for a main cabin blowout). However, some current aircraft have lower hold cargo compartments configured such that the partitions forming the sidewalls of the lower hold cargo compartments provide very little surface area to allow for placement of blow-out panels or decompression pressure relief panels at decompression pressure relief vents for decompression venting. It would therefore be desirable to provide a flame resistant decompression panel assembly configured to mounted over a decompression vent opening of a partition of an aircraft, and having a flame resistant bidirectional pressure relief panel that releases in either of two opposing directions from the decompression panel assembly during a decompression event.

In one known type of fire resistant pressure relief panel assembly, a one-way decompression panel assembly includes a support pan having an opening. A pressure relief panel is normally held between a portion of the support pan and a retaining ring. During a rapid decompression event, retaining ring fingers extending from the retaining ring flex slightly to reduce the holding force applied to the pressure relief panel, allowing the pressure relief panel to detach from the assembly in one direction.

In another type of conventional decompression panel for a partition separating aircraft passenger compartments from cargo compartments, a frame is provided around the decompression panel that is inserted into a decompression panel opening in the partition. One side of the frame includes a flange sealed against the decompression panel and the partition adjacent the opening, and the other side of the frame includes a plurality of T-shaped holding springs with predetermined fracture points engaging the partition and the decompression panel. In the event of a decompression event in the cargo compartment, fracture points in the T-shaped holding springs fracture, and the panel with the frame are forced out of the decompression panel opening. In the event of a decompression in the passenger compartment, other fracture points in the T-shaped spring fracture, forcing only the panel and not the frame out of the decompression panel opening.

Another type of aircraft decompression panel assembly is known that includes panel members having multiple holes with cover plates held in place over a decompression vent opening in a partition by retainer elements positioned about the perimeter of the panel members. In the event of a decompression across the partition in a one direction, the entire decompression panel assembly is dislodged. In the event of a decompression across the partition in the opposite direction, the retainer elements fracture allowing the cover plates to be dislodged from covering holes in the panel member.

It would be desirable to provide a decompression panel assembly configured to be mounted to a partition of an aircraft having a decompression vent opening therein, in which the decompression panel assembly includes a frame member dimensioned to cover a decompression vent opening in the partition, a pressure relief panel member, and means for releasably retaining the pressure relief panel member on the frame member such that the pressure relief panel member can be released bi-directionally when a predetermined pressure differential exists in either direction between the first and second sides of the partition, to permit decompression venting in either of two opposing directions through the decompression vent opening. It would be desirable to provide a fire resistant decompression panel assembly having a pressure relief panel member releasable in either of two opposing directions so as to require less surface area penetration into cargo hold walls, with fewer parts and reduced weight than prior conventional decompression panel assemblies. The present invention meets these and other needs.

SUMMARY OF THE INVENTION

Briefly, and in general terms, the present invention provides for a decompression panel assembly to be mounted over a decompression vent opening in an aircraft partition. The decompression panel assembly includes a frame member that can be fitted to the decompression vent opening, and a pressure relief panel member that is releasably retained to the frame member to cover the decompression vent opening. During a decompression event, the pressure relief panel member can be released bi-directionally in either of two opposing directions from the frame member when a predetermined pressure differential exists across the partition. The decompression panel assembly is fire resistant, and has reduced weight and fewer parts than prior conventional decompression panel assemblies.

Accordingly, the present invention provides for a decompression panel assembly configured to be mounted to an aircraft partition having a decompression vent opening between the first and second sides of the partition. The decompression panel assembly includes a frame member configured to be mounted to the aircraft partition, a pressure relief panel member, and means for releasably retaining the pressure relief panel member on the frame member such that the pressure relief panel member is releasable bi-directionally in either of two opposing directions from the frame member when a predetermined pressure differential exists between the first and second sides of the partition. The frame member has a body defining a frame opening therethrough, and the frame opening is dimensioned to cover the decompression vent opening in the aircraft partition and is aligned with the decompression vent opening in the partition so as to permit decompression venting through the decompression vent opening in first or second opposing directions.

In a presently preferred aspect, the body of the frame member includes a first side edge with a first radially outer flange extending radially outwardly from the first side edge of the frame member and adapted to be mounted to the partition. In another aspect, the body of the frame member includes a second side edge with a second radially outer flange spaced apart from the first radially outer flange and extending radially outwardly from the second side edge of the frame member. In another presently preferred aspect, the means for releasably retaining the pressure relief panel member on the frame member includes a plurality of spring clips secured to the second radially outer flange and biased to releasably secure the pressure relief panel member to the second radially outer flange. The spring clips are configured to release the pressure relief panel member from the second radially outer flange in either of two opposing directions away from the frame member when a differential pressure exists between the first and second sides of the partition that is less than 0.50 psi and greater than about 0.20 psi. In another presently preferred aspect, a retaining ring is disposed along a peripheral edge of the pressure relief panel member on one side of the panel member between the plurality of spring clips and the pressure relief panel member, and the plurality of spring clips are biased to releasably secure the pressure relief panel member and retaining ring to the second radially outer flange.

In another presently preferred aspect, the pressure relief panel member comprises a flame resistant membrane, such as a silicone impregnated glass fabric membrane. In another presently preferred aspect, the decompression panel assembly is capable of withstanding 1,600° F. for 5 minutes. In another presently preferred aspect, the frame member, spring clips, and retaining ring can be formed of corrosion resistant steel.

These and other aspects and advantages of the invention will become apparent from the following detailed description and the accompanying drawing, which illustrates by way of example the features of the invention.

BRIEF DESCRIPTION OF THE DRAWINGS

FIG. 1 is a perspective expanded view illustrating the fireproof bi-directional decompression panel of the present invention.

DETAILED DESCRIPTION OF THE PREFERRED EMBODIMENTS

Referring to FIG. 1, the present invention provides for a fire resistant decompression panel assembly 10 preferably capable of withstanding a 1,600° F. (871° C.) wall of flame for 5 minutes. The decompression panel assembly is configured to be mounted to a partition 12 of an aircraft, such as a sidewall of a cargo compartment of an aircraft, having a first side 14 and a second side 16. The aircraft partition includes a decompression vent opening 18 that is configured to permit decompression venting bi-directionally through the decompression vent opening in either a first direction shown by arrow A or a second opposing direction shown by arrow B. The decompression panel assembly includes a surround frame or frame member 20 having a generally tubular body 22 defining an opening 24 therethrough configured to be mounted to one side of the partition, and the frame opening is preferably dimensioned to cover the decompression vent opening in the aircraft partition and can be aligned with the decompression vent opening in the partition so as to permit decompression venting through the decompression vent opening in either of first or second opposing directions. The body of the frame member includes a first side edge 26 having a first radially outer flange 28 extending radially outwardly from the first side edge of the frame member. The first radially outer flange includes a surface defining a plurality of apertures 30, such as bolt holes, for example, for receiving fasteners (not shown) for mounting the first radially outer flange of the frame member to a side of the partition. The body of the frame member also includes a second side edge 32 having a second radially outer flange 34 spaced apart from the first radially outer flange and extending radially outwardly from the second side edge of the frame member. The frame member is preferably formed of a corrosion resistant steel.

The decompression panel assembly also includes a flame resistant pressure relief membrane or pressure relief panel member 36 that is releasably retained on the frame member such that the pressure relief panel member, and is releasable bi-directionally in either of two opposing directions from the frame member when a predetermined pressure differential exists between the first and second sides of the partition, such as a differential pressure across the partition of less than 0.50 psi and greater than about 0.20 psi, for example. In a presently preferred, aspect, the pressure relief panel member is a silicone impregnated glass fabric membrane, such as is available under the trade name Cargo Tex I from Northwest Aero Textiles of Burlington, Wash.

In a presently preferred aspect, a means 38 for releasably retaining the pressure relief panel member on the frame member such that the pressure relief panel member is released bi-directionally in either of two opposing directions from the frame member when the predetermined pressure differential exists between the first and second sides of the partition includes a plurality of spring clips 40, such as corrosion resistant steel spring clips, for example, secured to the second radially outer flange and biased to releasably secure the pressure relief panel member to the second radially outer flange. The spring clips are configured to release the pressure relief panel member from the second radially outer flange in either of two opposing directions away from the frame member when a differential pressure exists between the first and second sides of the partition that is less than 0.50 psi and greater than about 0.20 psi. The means for releasably retaining the pressure relief panel member on the frame member can include a retaining ring 42 disposed along a peripheral edge 44 of the pressure relief panel member on one side of the panel member between the plurality of spring clips and the pressure relief panel member, and the plurality of spring clips are biased to releasably secure the pressure relief panel member and retaining ring to the second radially outer flange, such that, during a decompression event in which a differential pressure between the first and second sides of the partition is less than 0.50 psi and greater than about 0.20 psi, the spring clips release the fireproof membrane or panel bi-directionally in either of two opposing directions away from the frame member and the partition.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A decompression panel assembly configured to be mounted to a partition of an aircraft having a first side, a second side, and a decompression vent opening therein between the first and second sides of the partition, the decompression panel assembly comprising:
a frame member configured to be mounted to a partition of an aircraft, said frame member being dimensioned to cover a decompression vent opening in the partition of an aircraft configured to permit decompression venting in a first direction through said decompression vent opening or a second direction opposing said first direction through said decompression vent opening, the frame member having a body defining a frame opening therethrough, said frame opening aligned with the decompression vent opening in the partition, said body of said frame member including a first side edge on a first side of the frame member corresponding to said first direction, said first side edge including a first radially outer flange extending radially outwardly from the first side edge of the frame member, said first radially outer flange being configured to be mounted to the partition, and said body of the frame member including a second side edge on a second side of the frame member opposing said first side of the frame member and corresponding to said second direction, said second side edge including a second radially outer flange spaced apart from the first radially outer flange, said second radially outer flange extending radially outwardly from the second side edge of the frame member;
a pressure relief panel member; and
a plurality of spring clips secured to said second radially outer flange and biased to releasably secure the pressure relief panel member to the second radially outer flange of said frame member such that the pressure relief panel member is released bi-directionally in either of said first and second opposing directions from said frame member when a predetermined pressure differential exists between the first and second sides of the partition.

2. The decompression panel assembly of claim 1, wherein said frame member is formed of corrosion resistant steel.

3. The decompression panel assembly of claim 1, wherein said pressure relief panel member comprises a flame resistant membrane.

4. The decompression panel assembly of claim 1, wherein said decompression panel assembly is capable of withstanding 1,600° F. for 5 minutes.

5. The decompression panel assembly of claim 1, wherein said pressure relief panel member comprises a silicone impregnated glass fabric membrane.

6. The decompression panel assembly of claim 1, wherein said spring clips are configured to release the pressure relief panel member from said second radially outer flange in either of said first and second opposing directions away from said frame member when a differential pressure exists between the first and second sides of the partition that is less than 0.50 psi and greater than about 0.20 psi.

7. The decompression panel assembly of claim 1, wherein said spring clips are formed of corrosion resistant steel.

8. The decompression panel assembly of claim 1, further comprising a retaining ring disposed around a peripheral edge of said pressure relief panel member on one side of said panel member between said plurality of spring clips and said pressure relief panel member.

9. The decompression panel assembly of claim 8, wherein said plurality of spring clips are biased to releasably secure the pressure relief panel member and retaining ring to the second radially outer flange.

10. The decompression panel assembly of claim 8, wherein said retaining ring is formed of corrosion resistant steel.

11. A decompression panel assembly configured to be mounted to a sidewall of a cargo compartment of an aircraft, the sidewall having a first and second sides, and a decompression vent opening therein extending between the first and second sides of the sidewall, the decompression panel assembly comprising:
a frame member configured to be mounted to a sidewall of a cargo compartment of an aircraft, said frame member being dimensioned to cover a decompression vent opening in the sidewall of an aircraft configured to permit decompression venting in a first direction through said decompression vent opening or a second direction opposing said first direction through said decompression vent opening, the frame member having a body defining a frame opening therethrough, said frame opening aligned with the decompression vent opening in the sidewall, said body of said frame member including a first side edge on a first side of the frame member corresponding to said first direction, said first side edge including a first radially outer flange extending radially outwardly from the first side edge of the frame member, and said body of the frame member including a second side edge on a second side of the frame member opposing said first side of the frame member and corresponding to said second direction, said second side edge including a second radially outer flange spaced apart from the first radially outer flange, said second radially outer flange extending radially outwardly from the second side edge of the frame member, and said first radially outer flange being configured to be mounted to the sidewall;
a pressure relief panel member;
a retaining ring disposed around a peripheral edge of said pressure relief panel member on one side of said panel member; and
a plurality of spring clips secured to said second radially outer flange and biased to releasably secure the pressure relief panel member and said retaining ring to the second radially outer flange, said pressure relief panel member being releasable bi-directionally from said second radially outer flange in either of two opposing directions from said frame member when a predetermined pressure differential exists between the first and second sides of the sidewall.

12. The decompression panel assembly of claim 11, wherein said spring clips are configured to release the pressure relief panel member from said second radially outer flange in either of opposing first and second directions away from said frame member when a differential pressure exists between the first and second sides of the sidewall that is less than 0.50 psi and greater than about 0.20 psi.

13. The decompression panel assembly of claim 11, wherein said pressure relief panel member comprises a flame resistant membrane.

14. The decompression panel assembly of claim 11, wherein said pressure relief panel member comprises a silicone impregnated glass fabric membrane.

15. The decompression panel assembly of claim 11, wherein said decompression panel assembly is capable of withstanding 1,600° F. for 5 minutes.

* * * * *